July 10, 1928.
E. J. STAHL
1,676,672
SEAT CONSTRUCTION AND SEAT ATTACHMENT
Filed Jan. 18, 1924
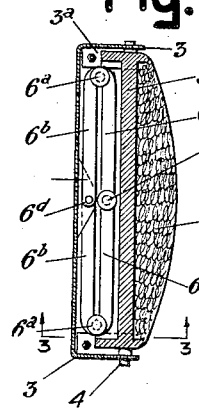
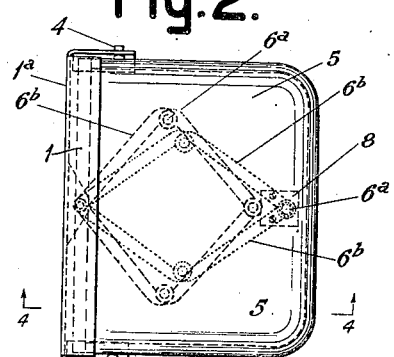
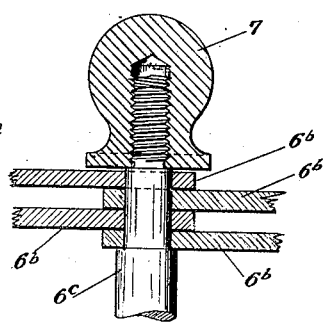
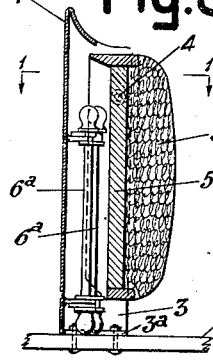
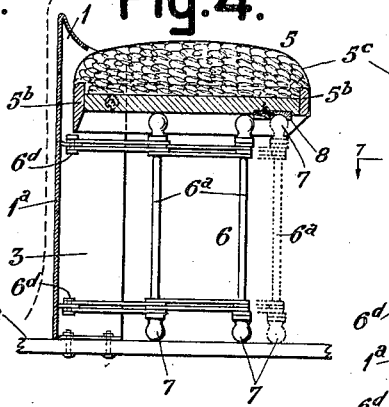
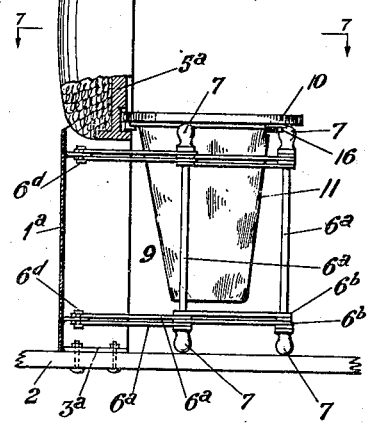
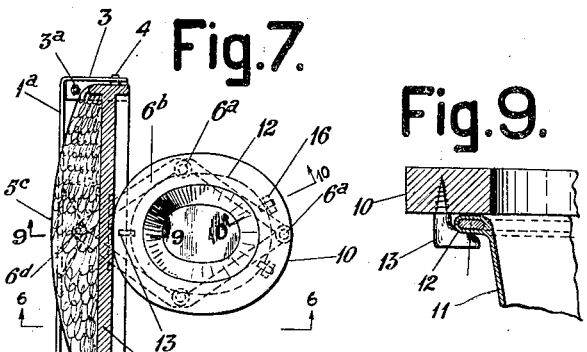
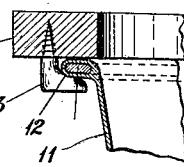
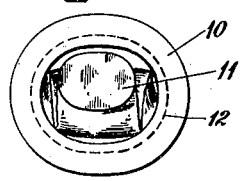
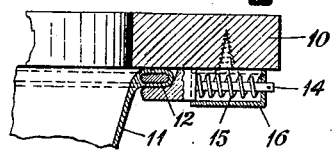
Inventor:
Edward J. Stahl
By: Edward R. Alexander
Attorney.

Patented July 10, 1928.

1,676,672

UNITED STATES PATENT OFFICE.

EDWARD J. STAHL, OF CLEVELAND, OHIO, ASSIGNOR TO THE BAKER-RAULANG COMPANY, OF CLEVELAND, OHIO, A CORPORATION OF OHIO.

SEAT CONSTRUCTION AND SEAT ATTACHMENT.

Application filed January 18, 1924. Serial No. 686,983.

This invention relates to a seat and seat attachment adapted to be supported or fixed to the floor or other suitable support, for example, the floor of an automobile or vehicle. In this latter application of the invention, the seat may be fixed to the floor of a vehicle preferably between the front and rear seats, especially where it is desired to eliminate the expense of a front seat back capable of supporting an auxiliary seat, as is customary in certain vehicles.

One object of the invention is to provide an improved construction of seat, capable of being readily collapsed or folded when not in use into a relatively small compact space.

Another object of the invention is to construct a seat having a relatively simple supporting means comprising articulatable elements capable of being readily assembled and easily opened into a supporting position.

A further object of the invention is to provide a seat having improved supporting means constructed to receive and support a container for packages or material.

Other objects of the invention will be apparent to those skilled in the art to which my invention relates from the following description taken in connection with the accompanying drawings, wherein Fig. 1 is a sectional view on the line 1—1 of Fig. 3 of a seat construction embodying my invention.

Fig. 2 is a plan view of the seat in position for use, its supporting means being shown in dotted lines in their unfolded or expanded position.

Fig. 3 is a section on the line 3—3 of Fig. 1.

Fig. 4 is a section on the line 4—4 of Fig. 2.

Fig. 5 is a detailed sectional view of certain elements of the supporting means.

Fig. 6 is a view showing the seat member thrown upwardly and an attachment supported by the seat supporting means; being partly in section on the line 6—6 on Fig. 7.

Fig. 7 is a section on the line 7—7 of Fig. 6.

Fig. 8 is a plan view of the attachment folded for storing purposes.

Fig. 9 is a section on the line 9—9 of Fig. 7.

Fig. 10 is a section on the line 10—10 of Fig. 7.

In the drawings, 1 indicates as an entirety a frame adapted to rest on the floor or other surface 2. When the floor 2 is the floor of a vehicle, the frame 1 is preferably set close to the back 2′ of the front seat—see Fig. 4. The frame 1 comprises the body portion 1ª, having side members 3, 3, which serve as supports for pivots 4, 4, upon which a seat member 5 is mounted. The side members 3 are preferably formed with openings, the walls of which form suitable bearings for the pivots or trunnions 4. The bearings for the pivots or trunnions 4 are mounted near the front edges of the side members to permit the seat member to be swung upwardly or downwardly and also to provide space between the seat member 5 and the body portion 1ª for the seat supporting means 6, to which reference will later be made, when the member 5 is folded to its non-use position—see Figs. 1 and 3. The lower ends of the side members 3 are preferably provided with flanges 3ª which may extend inwardly and suitable bolts may be inserted through openings formed in the flanges 3ª and the floor 2 to secure the frame 1 to the latter in a substantially rigid manner. The seat member 5 may be of any desired construction. That shown for illustrative purposes comprises a base 5ª, front and rear cleats 5ᵇ and a cushion 5ᶜ.

Referring to the supporting means 6, 6ª indicates a set of rods engaging the floor 2 and movable into spaced relation to support the seat member 5 and the weight of the person sitting thereon. 6ᵇ indicates sets of links pivotally connected to the rods 6ª near their upper and lower ends and to the frame 1. The links of each set are pivotally connected at their ends to the rods and to the frame 1 so that each set of links may be folded into a position, edge to edge—see Fig. 1—or unfolded—see dotted lines in Fig. 2. As the links of one set are equal in length to the links of the other set, it will be understood that when the sets of links are extended or unfolded, the rods 6ª are moved outwardly while being maintained upright in parallelism. By preference, the opposite ends of the rods 6ª are reduced to form shoulders 6ᶜ and the ends of the links are formed with openings which fit on the reduced ends of the rods against the shoulders 6ᶜ, being held on such ends and against the said shoulders by means of nuts 7 screw threaded on the free ends of the rods. The nuts 7 are preferably provided with closed outer ends which are of spherical shape. This form of construction permits the lower ends of the rods 6ª to move easily on the floor in either direction. Each set of links may consist of pairs of links and the ends of one pair may overlap the ends of the adjacent pair when assembled upon the rods 6ª. The pivotal connections for the links 6ᵇ with the frame 1 may be provided by up-setting portions of the metal of the latter and forming in such portion openings to receive suitable pintles 6ᵈ. As shown in Fig. 1, the inner ends of the two inner links of each set of links are connected to the adjacent pintle 6ᵈ and their outer ends are connected to two spaced rods 6ª, whereas the remaining or outer links of each set are connected at their outer ends to the spaced rods 6ª and their inner ends to the intermediate rod 6ª. Accordingly the pintle 6ᵈ for the inner links being fixed, if the intermediate rod 6ª is moved outwardly the effect of such movement will be to cause an articulation between the links and movement of the spaced rods outwardly, thereby forcing all of the rods into spaced relation so as to insure the supporting of the seat member 5 at its outer end and at spaced points intermediate its front and rear ends; likewise if the intermediate supporting rod is moved backwardly such movement will cause an articulation of the links in the opposite direction and movement of the spaced rods toward the frame 1. As already set forth, Fig. 1 shows the seat member and its supporting means in folded or collapsed position, the seat being disposed vertically in front of the frame 1 and the supporting means 6 folded in between the frame 1 and seat member, so that the rods and other elements of the supporting means are entirely covered. If it is desired to move the seat member into its supporting position, its free end is raised and the intermediate rod 6ª is moved outwardly into position to be engaged by the outer end of the seat. The seat member 5 may only be raised enough to permit the intermediate rod 6ª to be grasped, and then as the latter is pulled forward, the seat member may be swung downwardly as the rods assume their position. By preference, the lower side or face of the base 5ª may be provided with an interlocking element 8 to receive the nut 7 on the upper end of the intermediate rod 6ª and thus provide a detachable connection between the seat and the rod to prevent the latter from moving relative to the seat when the seat is in use.

9 indicates as an entirety an attachment for the seat comprising a container adapted to receive packages, goods or materials for storing purposes. The container 9 comprises a circular member 10 adapted to rest on the nuts 7 carried by the upper ends of the rods 6ª and a flexible bag 11 formed from suitable material, such as rubber or fabric and arranged to depend downward from the circular member 9 and occupy the space within the supporting means 6 when the latter are extended, as shown in Fig. 6. This arrangement provides a protection for the goods placed in the container. The container 9 may be readily positioned for use. When removed from the supporting means 6, the bag 11 may be folded into the space within the circular member for packing away. The bag 11 is preferably detachably connected to the under side of the circular member 10. For this purpose the open end of the bag 11 is provided with a bead 12. At one side the bead 12 engages a hook 13 fixed to the under side of the member 10; and at its opposite side the bead engages a pair of spring operated catches 14 which disengage the bead 12, to permit its removal, when retracted against the action of springs 15. The catches 14 are slidably mounted in suitable casings 16, secured to the under side of the circular member 10.

From the foregoing description it will be seen that I have provided a seat of simple construction and one which may be readily and economically provided in any desired place, for example as an auxiliary seat for a vehicle. In my construction, the seat construction is adapted to rest upon the floor independently of any of the equipment of the vehicle. As shown the seat member and its supporting means are connected to a frame resting on the floor and may be folded relative to the frame to a non-use position with the supporting means entirely hidden from view. The supporting means are constructed so that by movement outwardly or away from the frame in a direction parallel to the floor they unfold in spaced relation to support the seat member and also to removably receive and support a container for goods and material.

To those skilled in the art to which my invention relates, many alterations in construction and widely differing embodiments and applications of the invention will suggest themselves without departing from the spirit and scope thereof. My disclosures and the description herein are purely illustrative and are not intended to be in any sense limiting.

What I claim is:—

1. In a seat construction, the combination of a frame adapted to be supported on the floor, a seat pivoted to the upper end of said frame and swingable downwardly into a position in front of said frame, and means for supporting said seat in a horizontal position, said means comprising superposed sets of links pivoted to said frame in spaced relation and rods engaging the floor and forming pivotal connections between the said sets of links to permit the latter to be expanded laterally away from said frame into position to be engaged by said seat when swung to a horizontal position.

2. In a seat construction, the combination of an upright frame, a seat pivotally connected at its inner end to the upper end of said frame, a plurality of rods engaging the floor and movable thereon to form supports for said seat, sets of links pivotally connected to said frame in superposed spaced relation and pivotally connected together by said rods and arranged to maintain the latter upright when moved into a supporting position.

3. In a seat construction, the combination of an upright frame, a seat pivotally connected at its inner end to the upper end of said frame and foldable upwardly relative thereto and downwardly to a position in front of said upright frame, and supporting means for said seat, said supporting means comprising sets of links pivoted to said frame in superposed spaced relation and upright rods forming pivots between the links of each set, whereby said rods are connected together in parallelism and may be moved laterally relative to said upright frame into position to support said seat in position for use.

4. In a seat construction, the combination of an upright frame adapted to be supported on the floor, a seat pivoted at its inner end to upper end of said upright frame, a plurality of rods for supporting said seat slidably engaging the floor, and sets of links pivoted to said frame in superposed spaced relation and connected together by said rods, whereby the latter may be moved in a plane parallel with the floor and laterally away from said upright frame while maintained upright into a position to support said seat in a horizontal position or in a compact relation in front of said frame.

5. In a device of the character described, the combination of an upright frame adapted to engage the floor, and a supporting means, said means comprising a plurality of rods and a plurality of sets of links having spaced pivotal connection with said rods at points remote from their upper and lower ends and with said frame, to permit said rods to be moved on the floor while maintained parallel into spaced relation with the links defining a space, whereby the upper ends of said rods may support a seat or the rim member of a container positioned within said space.

In testimony whereof, I have hereunto signed my name.

EDWARD J. STAHL.